(12) United States Patent
Barton (10) Patent No.: US 9,725,316 B2
(45) Date of Patent: Aug. 8, 2017

(54) HYDROGEN GENERATOR WITH REPLACEABLE FUEL UNIT AND A METHOD OF PRODUCING HYDROGEN GAS

(71) Applicant: Intelligent Energy Inc., San Jose, CA (US)

(72) Inventor: Russell H. Barton, New Westminster (CA)

(73) Assignee: Intelligent Energy Inc., San Jose, CA (US)

( * ) Notice: Subject to any disclaimer, the term of this patent is extended or adjusted under 35 U.S.C. 154(b) by 158 days.

(21) Appl. No.: 14/816,029

(22) Filed: Aug. 2, 2015

(65) Prior Publication Data

US 2015/0340719 A1    Nov. 26, 2015

Related U.S. Application Data

(63) Continuation of application No. PCT/US2013/029486, filed on Mar. 7, 2013.

(51) Int. Cl.
*B01J 7/00* (2006.01)
*C01B 3/02* (2006.01)
(Continued)

(52) U.S. Cl.
CPC ........ *C01B 3/02* (2013.01); *B01J 3/04* (2013.01); *B01J 19/24* (2013.01); *C01B 3/0005* (2013.01);
(Continued)

(58) Field of Classification Search
CPC combination set(s) only.
See application file for complete search history.

(56) References Cited

U.S. PATENT DOCUMENTS

| | | |
|---|---|---|
| 4,225,320 A | 9/1980 | Gell |
| 5,262,619 A | 11/1993 | Karner |

(Continued)

FOREIGN PATENT DOCUMENTS

| | | |
|---|---|---|
| EP | 1284516 A2 | 2/2003 |
| EP | 1467138 A2 | 10/2004 |

(Continued)

OTHER PUBLICATIONS

U.S. Appl. No. 16/657,909, filed Jun. 11, 2012.
(Continued)

*Primary Examiner* — Imran Akram
(74) *Attorney, Agent, or Firm* — Baker & Hostetler LLP (57) ABSTRACT

Disclosed are a hydrogen generator and a method of producing hydrogen gas therefrom. A fuel unit containing a fuel that releases hydrogen gas when heated is removably disposed in a cavity within a housing having a door. A heater assembly for heating the fuel unit is disposed in the hydrogen generator. A mechanism retracts the heater assembly from the fuel unit when the door is opened and extends the heater assembly to contact the fuel unit when the door is closed. When the heater assembly is retracted, more space is available into which the fuel unit can be inserted to prevent damage to the heater assembly and the fuel unit, and when the heater assembly is extended, good contact is provided between the heater assembly and the fuel unit for efficient heating. A cam bar can move the heater assembly normal to the lateral motion of the cam bar.

11 Claims, 3 Drawing Sheets

(51) Int. Cl.
*B01J 19/24* (2006.01)
*B01J 3/04* (2006.01)
*C01B 3/00* (2006.01)
*C01B 3/04* (2006.01)
*C01B 3/06* (2006.01)
*H01M 8/065* (2016.01)
*H01M 8/04082* (2016.01)

(52) U.S. Cl.
CPC ............... *C01B 3/04* (2013.01); *C01B 3/065* (2013.01); *B01J 2219/00135* (2013.01); *H01M 8/04208* (2013.01); *H01M 8/065* (2013.01); *Y02E 60/324* (2013.01); *Y02E 60/362* (2013.01); *Y02E 60/364* (2013.01)

(56) References Cited

U.S. PATENT DOCUMENTS

| | | |
|---|---|---|
| 6,091,050 A | 7/2000 | Carr |
| 6,749,702 B1 | 6/2004 | Knowlton et al. |
| 7,241,527 B2 | 7/2007 | Liu et al. |
| 7,655,056 B2 | 2/2010 | Devos |
| 7,867,441 B2 | 1/2011 | Eckels et al. |
| 7,964,111 B2 | 6/2011 | Perut et al. |
| 2005/0058879 A1 | 3/2005 | Guay |
| 2005/0074643 A1 | 4/2005 | Adams et al. |
| 2005/0202291 A1 | 9/2005 | Schweizer |
| 2006/0174952 A1 | 8/2006 | Curello et al. |
| 2008/0026269 A1 | 1/2008 | Shurtleff et al. |
| 2008/0118787 A1 | 5/2008 | Wexel et al. |
| 2008/0236032 A1 | 10/2008 | Kelly et al. |
| 2008/0241613 A1 | 10/2008 | Kelly et al. |
| 2008/0286621 A1 | 11/2008 | Rosenzweig et al. |
| 2009/0060833 A1 | 3/2009 | Curello et al. |
| 2009/0078345 A1 | 3/2009 | Kellet et al. |
| 2009/0324452 A1 | 12/2009 | Salinas et al. |
| 2009/0325009 A1 | 12/2009 | Kim et al. |
| 2010/0012219 A1 | 1/2010 | Shibukawa et al. |
| 2010/0080735 A1 | 4/2010 | Zimmermann |
| 2010/0104481 A1 | 4/2010 | Curello et al. |
| 2011/0027168 A1 | 2/2011 | Yvart et al. |
| 2011/0176973 A1 | 7/2011 | Rosenzweig et al. |
| 2011/0189562 A1 | 8/2011 | Wu et al. |
| 2011/0197873 A1 | 8/2011 | Weber et al. |
| 2011/0212374 A1 | 9/2011 | Rosenzweig et al. |
| 2012/0115054 A1 | 5/2012 | Wallace et al. |
| 2013/0108940 A1 | 5/2013 | Langan et al. |
| 2014/0137562 A1* | 5/2014 | Law .................. F02C 7/00 60/772 |
| 2014/0140919 A1 | 5/2014 | Langan |
| 2014/0277880 A1* | 9/2014 | Takaku ............. B60L 11/1885 701/22 |

FOREIGN PATENT DOCUMENTS

| | | |
|---|---|---|
| JP | 2010-126417 A | 6/2010 |
| JP | 2012-082102 A | 4/2012 |
| JP | 2012-084366 A | 4/2012 |

OTHER PUBLICATIONS

Diwan et al.; Combustion wave propagation in magnesium/water mixtures: Experiments and Model; Chemical Engineering Science; 2010; vol. 65; p. 80-87.

Shafirovich et al.; "Combustion-assisted hydrolysis of sodium borohydride for hydrogen generation"; International Journal of Hydrogen Energy; Feb. 2007; vol. 32 Issue 2; p. 207-211.

International Patent Application No. PCT/US2013/054918; Int'l Search Report and the Written Opinion; dated Nov. 18, 2013; 10 pages.

International Patent Application No. PCT/US2013/054918; Int'l Preliminary Report on Patentability; dated May 28, 2015; 7 pages.

International Patent Application No. PCT/US2013/021538; Int'l Preliminary Report on Patentability; dated May 28, 2015; 8 pages.

* cited by examiner

HYDROGEN GENERATOR WITH REPLACEABLE FUEL UNIT AND A METHOD OF PRODUCING HYDROGEN GAS

CROSS-REFERENCE TO RELATED APPLICATIONS

This patent application is a Continuation of international patent application PCT/US2013/029486 filed Mar. 7, 2013, the disclosures of which are incorporated by reference in its entirety.

TECHNICAL FIELD

The invention relates to a hydrogen generator, particularly a hydrogen generator with a replaceable fuel unit that produces hydrogen gas when heated, and to a method of producing hydrogen gas with the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (e.g., a fuel cell stack), and a fuel source, such as a fuel tank or a hydrogen generator. Hydrogen generators that supply hydrogen gas to a fuel cell can be an integral part of a fuel cell system, or they can be removably coupled to the fuel cell system. A removable hydrogen generator can be replaced with another one when the hydrogen containing materials have been consumed. Removable hydrogen generators can be disposable (intended for only a one-time use). Both removable and permanently installed hydrogen generators can be refillable (intended for use multiple times) to replace consumed fuel composition.

Hydrogen generators can produce hydrogen using a variety of hydrogen-containing materials and a variety of methods for initiating the release of hydrogen gas. Some hydrogen-containing materials (fuels) can be heated to release hydrogen gas, such as in a chemical decomposition reaction.

For cost-effective hydrogen generation it is desirable to be able to use durable components of the hydrogen generator many times, replacing spent fuel with fresh material. To accomplish this, a replaceable fuel unit containing the fuel and minimal packaging can be inserted into a hydrogen generator containing heaters and other components. Close contact between the heaters and the fuel unit is desired for efficient heating. In some situations it is desirable to slide fuel units into and out of the hydrogen generator. This can lead to damage to the fuel unit or heaters. One approach is to use materials for the heaters and the fuel unit package that are able to withstand the forces of fuel unit insertion and removal, but this can add to the cost of both the hydrogen generator and the fuel unit.

An object of the invention is to provide a hydrogen generator in which spent fuel units can be replaced with fresh ones without damaging either the hydrogen generator or the fuel unit. Another object of the invention is to provide a hydrogen generator and replaceable fuel units that do not have to be made with unnecessarily expensive materials. Yet another object of the invention is to provide a hydrogen generator that is able to tolerate variability in fuel unit dimensions, particularly as a result of fuel unit shrinkage or swelling during use, while still maintaining good contact between the heater and the fuel unit.

SUMMARY

The above objects are met and the above disadvantages of the prior art are overcome by a hydrogen generator with a heater assembly is retracted to provide clearance for inserting and removing a fuel unit and extended to contact the fuel unit and provide efficient heating when the fuel unit is in place and the hydrogen generator is ready for use.

Accordingly, one aspect of the present invention is a hydrogen generator including a housing having a door, a cavity within the housing, a fuel unit removably disposed within the cavity and containing a hydrogen-containing material that can release hydrogen gas when heated, and a heater assembly including a heater disposed in the cavity for heating the fuel unit. The fuel unit is removable when the door is in an open position, and the housing is sealed when the door is in a closed position; the heater assembly is in a retracted position in which a gap is present between the heater assembly and the fuel unit when the door is in the open position; the heater assembly is in an extended position in which the heater assembly is disposed against the fuel unit when the door is in the closed position; and the hydrogen generator further includes a mechanism for moving the heater assembly between the retracted and extended positions, the motion of the heater assembly being actuated by a motion of the door between the open and closed positions. In various embodiments, the hydrogen generator can include one or more of the following features:

the mechanism for moving the heater assembly includes a movable cam bar; the cam bar can include one or more angled surfaces that engage the heater assembly; the cam bar can be movable when the door is moved between the open and closed positions; the cam bar can be attached to the door; the cam bar can be biased by a biasing member to move toward the door when the door is moved from the closed position and pushed against the biasing member when the door is moved to the closed position;
  the heater assembly includes a heater support to which the heater is secured; the heater support can be movable by the mechanism; the heater support can bias the heater assembly away from the housing; the heater support can bias the heater assembly toward the housing; the mechanism for moving the heater assembly can deflect the heater support to move the heater assembly; the mechanism can include a cam bar with an angled surface that deflects the heater support in a direction normal to a lateral motion of the cam bar;
  the fuel unit includes a single quantity of the hydrogen-containing material;
  the fuel unit includes a plurality of segregated quantities of the hydrogen-containing material;
  the hydrogen generator includes a single heater; and
  the hydrogen generator includes a plurality of heaters; each heater is disposed on a single heater assembly; the plurality of heaters is disposed on a plurality of heater assemblies; each heater can be disposed to heat one or more of a plurality of segregated quantities of the hydrogen-containing material; each heater can be disposed to heat only one of the plurality of segregated quantities of the hydrogen-containing material.

A second aspect of the invention is a method of producing hydrogen gas with a hydrogen generator including a housing having a door, a cavity within the housing, a fuel unit removably disposed within the cavity and containing a hydrogen-containing material that can release hydrogen gas when heated, and a heater assembly including a heater disposed in the cavity for heating the fuel unit. The method includes the steps: (a) opening the door, thereby causing a mechanism to retract the heater assembly toward the housing to increase a space within which the fuel unit can be disposed; (b) inserting a fuel unit in the cavity; (c) closing the door, thereby causing the mechanism to extend the heater assembly toward the fuel unit and make contact therewith; (d) heating the fuel unit with the heater, thereby releasing hydrogen gas from the hydrogen-containing material; (e) ceasing heating of the fuel unit; (f) opening the door, thereby actuating the mechanism to retract the heater assembly toward the housing to create a gap between the heater assembly and the fuel unit; and (g) removing the fuel unit. In various embodiments, the hydrogen generator can include one or more of the features disclosed above.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DESCRIPTION

Fuel units can be used in a hydrogen generator in which the fuel composition in a fuel unit is heated to produce hydrogen gas. The hydrogen gas can be used by a hydrogen consuming apparatus, such as a hydrogen fuel cell battery. The hydrogen generator can include a housing and one or more heater assemblies to heat a fuel composition in one or more fuel units to at least a minimum temperature.

In order to provide an economical hydrogen generator, it is desirable to be able to replace spent fuel composition (e.g., reaction byproducts) with fresh fuel composition, rather than replacing the entire hydrogen generator. This allows durable components of the hydrogen generator to be used many times. To maximize this effect, it is desirable to incorporate as many reusable components as practical into the reusable portion of the hydrogen generator (referred to below as the holder), the rest of the fuel cell system and/or the device associated with the fuel cell system, and to limit the number of components in the replaceable portion of the hydrogen generator (referred to below as the fuel unit) to the greatest extent practical. This is particularly true for such items that occupy a relatively large volume and/or are relatively expensive. Ideally, fuel units would contain only the hydrogen containing materials and minimal packaging. However, for practical reasons it may also be desirable to include other ingredients and components in the fuel units.

Preferably the hydrogen generator is portable, either alone or as part of a hydrogen consuming apparatus, such as part of a fuel cell system including a fuel cell battery or contained within a portable device that can be powered by a fuel cell system. As used herein, portable means readily moved by an individual person, without requiring the use of lifting or transporting equipment (e.g., a hoist, dolly, lift truck or the like).

A hydrogen generator according to the present invention generates hydrogen gas by heating hydrogen-containing material (referred to below as fuel) to release hydrogen gas. The fuel is contained in fuel units (also referred to as fuel cartridges) that can be replaced after the fuel contained therein is depleted of releasable hydrogen. One or more fuel units are inserted into a cavity within a housing through a door in the housing. The door contains the fuel units within the housing during use and prevents the hydrogen gas from escaping to the surrounding environment. One or more heater assemblies, each including one or more heaters, are disposed in the cavity, in contact with the fuel cartridge when the door is in a closed position. Each heater assembly makes contact with a fuel cartridge in order to provide efficient heating of the fuel cartridge. When the door is moved from the closed position to an open position, the heater assembly is automatically retracted from the fuel unit so there is a gap between the heater assembly and the corresponding heating surface of the fuel unit by the time the door is opened far enough to remove and insert a fuel unit. Clearance between the door and the remainder of the housing when the door is in the open position allows removal and insertion of fuel cartridges without damage to either the fuel cartridge or heater assembly. Details of embodiments of the hydrogen generator, fuel unit and the production of hydrogen gas are disclosed in greater detail below.

The hydrogen generator has a housing defining one or more cavities in which one or more fuel cartridges can be replaceably disposed. The housing includes one or more doors that can be closed to contain the fuel cartridge and hydrogen gas when the hydrogen generator is in use. The hydrogen generator can also include one or more hydrogen outlets for releasing hydrogen gas, e.g., to a hydrogen consuming apparatus such as a fuel cell. One or more heater assemblies are disposed in the cavity/cavities for heating the fuel cartridge(s) to release hydrogen gas therefrom. Also included in the hydrogen generator are one or more mechanisms for moving the heater assemblies between retracted and extended positions when the door(s) are moved between its open and closed positions, respectively. The heater(s) are automatically retracted and extended by the mechanism as the door(s) are opened and closed. While the hydrogen generator can include or use one or more than one of various components or items (e.g., cavities, doors, heaters, retracting/extending mechanisms, fuel cartridges, and so forth), for convenience these components and items may be referred to below as singular or plural components/items, but it will be understood that such usage is not limiting.

The housing is made of a material that can withstand the ranges of temperature and pressure expected during usage. The housing may be a separate unit that can be connected to, installed in or used with a hydrogen consuming appliance, or it can be a part of such an appliance. The shape, dimensions and configuration of the housing can vary. The housing, as well as the door, can include a single wall or multiple walls, e.g., to provide a space, a vacuum or thermal insulation therebetween.

The door can be of any suitable design. It can remain movably attached to the housing, such as with a hinge, or it can be removable. The door can include a suitable mechanism for securing it in a sealed state to the housing. In some embodiments the door can include a locking mechanism that can prevent opening the door under undesirable conditions, such as high temperature or high internal pressure. The door can include a sealing member, such as a gasket, grommet or other caulking material, to provide a gas-tight seal between the door body and a corresponding opening in the housing.

The cavity defined by the housing can be suitably sized and shaped to accommodate the fuel cartridge and other components of the hydrogen generator.

The hydrogen generator can include a suitable hydrogen gas outlet through the housing. This outlet can be an aperture or tube for example, or it can include a valve such as a one-way or flow regulating valve. A flow regulating valve may be controlled by the hydrogen generator, or it may cooperate with or be controlled by a hydrogen consuming appliance being supplied by the hydrogen generator.

The heater assembly includes a heater, which can be any suitable type of heater. It can be an electrically operated heater, such as a resistive, inductive or electrostatic heater. A preferred type of heater is a resistive heater. The heater assembly can include one or a combination of electric circuitry, heaters, thermally conductive plates, heater controls, and so forth. The heater can be operated by a suitable power source, which may be contained within or outside the hydrogen generator. The surface of the heater assembly that makes contact with the fuel cartridge can be a thermally conductive plate that protects one or more heating elements. The heater assembly includes a heater support, to which the heater is secured. The heater can be secured with a mount, which can allow the heater to pivot to press evenly on the surface of the fuel cartridge to be heated (i.e., the heating surface of the fuel cartridge) to provide more uniform and efficient heating.

The heater support can exert a spring force to bias the heater toward or away from the housing (away or toward an inserted fuel unit). The mechanism for moving the heater assembly can work against the spring force to deflect the heater support and move the heater assembly into the extended or retracted position. In one embodiment the heater support includes a single piece of spring metal. In another embodiment the heater support includes a leaf spring, with multiple layers of spring metal bracketed together. The heater support can be secured at one end, e.g., directly or indirectly to the housing, and the opposite end can be movable by the mechanism for moving the heater assembly. Alternatively, the heater support can be secured at opposite ends, so a center portion can be moved by the mechanism for moving the heater assembly, as may be advantageous in embodiments where two heaters are mounted to the same heater support.

The mechanism for moving (retracting and extending) the heater assembly can include one or more cam bars that can move laterally within the cavity in the housing (i.e., toward and away from the door opening) as the door is opened and closed. The cam bar can include an angled surface that is neither parallel nor normal to the lateral motion of the cam bar. As the cam bar moves laterally, the heater support travels along this surface so the cam bar moves in a direction normal to the lateral motion of the cam bar.

The door seals the housing when the door is closed and allows access to the cavity for replacing the fuel unit when the door is open. In one embodiment the door is attached to an end of the retracting/extending mechanism, so moving the door between the open and closed positions will move the mechanism. In various examples, moving the door outward from or inward toward the door opening can move the mechanism (e.g., cam bar) laterally in the same direction as the door, or pivoting the door on a hinge can move the mechanism laterally; and the door can be removed from the mechanism after moving the door outward, or the door can be remain movably attached to the mechanism, such as by a hinge so the door can swing open so that after the mechanism is moved laterally, the door can be swung open to providing more clearance for inserting and removing the fuel cartridge. In another embodiment the mechanism is biased toward the door opening so the mechanism retracts the heater assembly when the door is moved to the open position and the mechanism is pushed against the biasing force to extend the heater assembly when the door is moved to the closed position. In this embodiment it may not be necessary to attach the door to the mechanism. When closed, the door can be secured within the door opening by a suitable latch mechanism. In some embodiments an interlock system can be used to prevent opening the door under undesirable conditions (e.g., when the internal pressure in the hydrogen generator is above ambient or when the fuel unit is above a safe temperature. A seal member, such as a gasket or grommet, can be included between the door and the door opening to provide a good seal.

The hydrogen generator, a hydrogen consuming apparatus or a combination thereof can include a control system to control operation of the heaters, as well as other control functions, such as hydrogen gas flow, temperature monitoring, pressure monitoring, hydrogen gas flow, fuel gauging, authentication of proper fuel cartridges, locking and unlocking the door, and so on.

The fuel cartridge can include a package in which the fuel composition is disposed. The packaged fuel cartridge can be removably inserted into a hydrogen gas generator that can be used to provide hydrogen gas to a device, such as a fuel cell battery or other hydrogen consuming device or appliance. The fuel composition is enclosed within the package and includes one or more hydrogen containing materials that can release hydrogen gas when heated to at least a minimum temperature. Heat from the heater assembly is conducted through the package to initiate the release of hydrogen gas from the fuel composition.

A fuel unit package can contain the fuel composition as well as non-gaseous byproducts. The package will have sufficient strength and chemical and thermal stability to do so during shipping, during storage and handling prior to use, during use, and during removal and subsequent handling. The package can be made from a variety of materials, such as metal foil, polymer film, laminates such as metal/plastic laminates, and cast or molded casings. Examples of metal/plastic laminates include metals such as aluminum, nickel, copper and steel and polymers such as polyesters, nylons, polypropylene and polyethylene. High temperature plastics and thermosets can be used to cast or mold casings; examples include polyimides such as KAPTON® (from DuPont) and polyether ether ketone (PEEK) polymers. The package can be closed by any suitable method or methods, such as by folding and/or overlapping, mechanically closing, sealing (e.g., with an adhesive, heat seal, ultrasonics) and so on. It may also be desirable for the package to remain sealed except to release hydrogen as needed. This can require sealing the package, the use of a hydrogen outlet valve and/or the capability of containing at least some internal pressure for example. Sealing the package can protect the contents from exposure to the environment (e.g., from oxygen and moisture), contain small quantities of hydrogen that may be produced before the fuel unit is used and facilitate removal of contaminants from the hydrogen gas before it is released from the fuel unit.

It may be desirable to include thermal insulation near or as part of the package to protect the user when a used fuel unit is removed from the hydrogen generator. The package itself may be or include (e.g., as a layer thereof) a poor thermal conductor, or a layer of thermal insulation can be provided external or internal to the package. Examples of materials that may be suitable as thermal insulation include silica, silicon dioxide, silicon nitrides, silicon carbide, silica aerogel, calcium silicate, foamed silicone, alumina, aluminum oxide, glass, glass wool, mineral wool, cellular glass, perlite, and elastomers and polymers such as polyimides and epoxy-amine composites.

An example of a suitable fuel cartridge package and a method of making it are disclosed in U.S. Provisional Application No. 61/657,909, entitled "Method of Making a Packaged Fuel Unit for a Hydrogen Generator, filed Jun. 11, 2012. This package includes a plurality of thermally conductive sections in a package wall that is otherwise a relatively poor thermal conductor. The thermal conductor sections are in thermal communication with a plurality of segregated quantities of fuel composition, such that the release of hydrogen gas can be selectively initiated in individual segregated quantities, each providing a limited amount of hydrogen gas. In the assembled fuel cartridge, the conductor sections in the package are disposed to conduct heat from an external heater through the package. Each conductor section can conduct heat from a separate heater through the package, or heat from more than one heater can be conducted through a single conductor section.

It may be desirable to include thermal conductors within the fuel cartridge to provide good heat transfer to remote portions of the fuel composition (portions that are not close to the package or to the heaters). Additives may be included in the fuel composition for this purpose, or thermally conductive components can be included within the fuel unit.

The fuel composition includes one or more hydrogen-containing materials that can release hydrogen gas when heated. Preferred materials do not require costly catalysts to undergo hydrogen-generating reactions. Examples of hydrogen containing materials that may be suitable include materials that can reversibly absorb and desorb hydrogen (e.g., metal-organic frameworks (MOFs), zeolites, graphene, carbon nanotubes and metal hydrides as AB5 and AB2 type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane), and various combinations including the above materials. Choices of materials may be limited by other factors such as physical and chemical properties of the material; the type and location of heater(s); the temperature range for the desired release of hydrogen gas; whether the hydrogen release is exothermic or endothermic; the composition, form and properties of byproducts; and so on.

The fuel composition can also contain one or more additives. Examples of additives include binders (e.g., acrylates and styrene block copolymers), stabilizing compounds (e.g., solid bases), thermally conductive materials (e.g., metals, graphites and combinations and composites thereof), ignition materials as described below, thermally conductive coatings or layers, thermally insulating coatings or layers, and so on. Preferably catalysts are not included in the fuel composition.

It may be desirable to include an ignition material in the fuel unit, especially if the release of hydrogen gas is endothermic. An ignition material reacts exothermically when heated and can be used in conjunction with the initiation system to provide heat to initiate the release of hydrogen gas from the hydrogen containing material. An ignition material can provide a number of advantages. The temperature to which the ignition material must be heated to react may be lower than the minimum temperature to which the hydrogen containing material must be heated, reducing the heat producing requirement for the initiation system. Because the ignition material reacts exothermically, it can reduce the total amount of energy that must be supplied to the heater(s) during use of the fuel unit, particularly if the release of hydrogen gas by the hydrogen containing material is endothermic. An ignition material can be disposed within or in contact with the fuel composition. For example, the ignition material can be an ingredient of the fuel composition, the ignition material can be a separate layer of the fuel composition from the portion containing the hydrogen containing material, or ignition material can be in a separate pellet in thermal communication with the fuel composition. When an ignition material is separate from the hydrogen containing material, portions containing ignition material can be alternated with portions containing hydrogen containing material. For example, each portion containing hydrogen containing material can have an adjacent portion of ignition material; a portion containing ignition material can be disposed adjacent to multiple portions of fuel composition. If desired, ignition material can be proximate a surface of the fuel unit to facilitate initiation by the heater assembly. A portion of ignition material can extend away from the point of initiation to facilitate heating fuel composition in more remote portions of the fuel unit. In some embodiments, both the portion of the fuel unit containing hydrogen containing material and the portion containing ignition material contain both hydrogen containing and ignition materials, but in different proportions. Some types of ignition materials will also generate hydrogen gas when they react, contributing to the total amount of hydrogen the fuel unit can provide. Examples of ignition materials include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/

0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 2008/0241613A1. Other compositions include gels of metals and water such as Mg/water/poly(acrylamide-co-acrylic acid) alone or in combination with sodium borohydride (Varma, et al. Chem. Eng. Sci. 2010, 65, 80-87 and Int. J. Hydrogen En 2007, 32, 207-211, respectively). It will be understood that references herein to initiating a release of hydrogen gas from a hydrogen containing material includes initiating a heat generating reaction in an ignition material in embodiments in which the fuel unit includes an ignition material.

The fuel composition is preferably a high density solid, such as in powdered or granular form (e.g., contained in one or more compartments), or formed into solid bodies such as pellets, pills, tablets, wafers or cakes, e.g., by compressing, molding extruding depositing, coating roll coating, printing, and so on. The fuel composition can be in contained within one or more receptacles or formed on a substrate with the fuel unit. Each fuel unit can have a single quantity of fuel composition, or the fuel composition can be disposed in one or more segregated quantities. Quantities of fuel composition can be sized and shaped to produce a desired amount of hydrogen gas, fit within the fuel unit in a volume efficient manner, facilitate initiation (heating), prevent cross-initiation of adjacent quantities, facilitate release of generated hydrogen, and so on.

Segregated quantities of fuel composition can be separated from one another in various ways, such as by containment in individual compartments and/or being spaced apart by gaps, coatings, thermal insulation and the like. If the fuel composition is contained in one or more compartments, the compartments may be covered with a covering layer to retain the material in the desired compartments. The compartments and the covers can be part of the fuel unit package.

As disclosed above, the hydrogen generator can include a plurality of heaters, a plurality of fuel cartridges or segregated quantities of fuel, or various combinations thereof. For example, a plurality of heaters can be positioned to heat different portions of a single fuel cartridge or segregated quantity of fuel in order to provide more efficient or more thorough heating; a single heater can be used to heat more than one fuel cartridge or segregated quantity of fuel; each heater can be positioned to heat a single fuel unit or segregated quantity of fuel; or a combination thereof.

Operation of the hydrogen generator can be summarized as follows: the door to the hydrogen generator is opened, causing a mechanism to retract the heater assembly toward the housing, thereby increasing a space within which a fuel unit can be disposed; a fuel unit is inserted into the cavity; the door is closed, thereby causing the mechanism to extend the heater assembly toward the fuel unit to make contact therewith; the fuel unit is heated with the heater, thereby releasing hydrogen gas from the fuel; heating of the fuel unit is ceased; the door is opened, thereby retracting the heater assembly toward the housing to create a gap between the heater assembly and the fuel unit; and removing the fuel unit from the hydrogen generator.

An embodiment of a hydrogen generator according to the invention is described below, with reference to the accompanying drawings. In the description below, the terms side, top and bottom refer to the side, top and bottom of the hydrogen generator as oriented in the drawings, though the hydrogen generator does not have to be so oriented in use.

Figure 1:
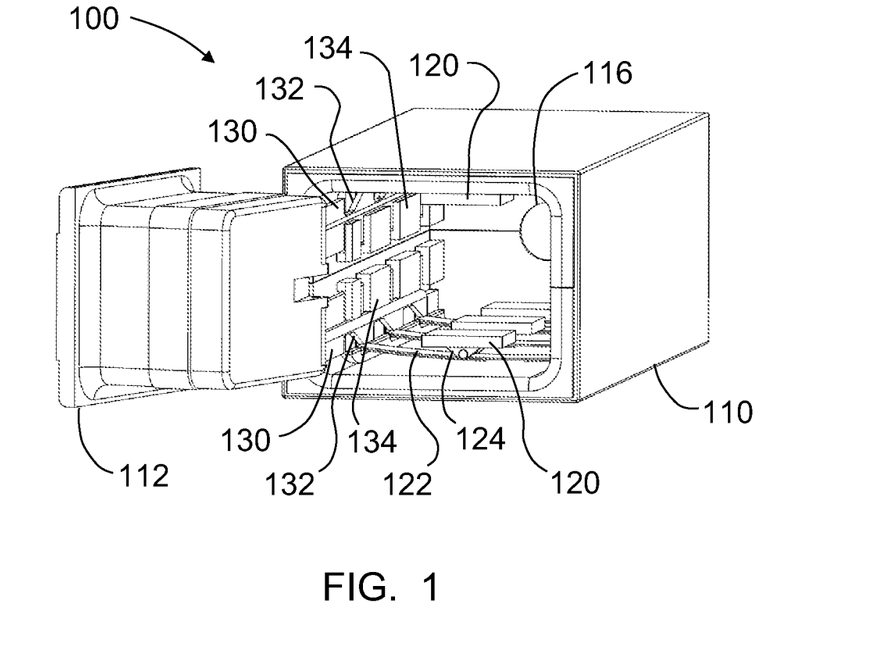
FIG. 1 is a front perspective view of a hydrogen generator with the door open.

FIG. 1 shows a hydrogen generator 100 with a housing 110 defining a cavity in which a fuel cartridge 200 (FIG. 2) can be replaceably inserted. The fuel cartridge 200 can be inserted through an opening in the housing 110 that can closed and sealed by a door 112. The hydrogen generator also includes a hydrogen outlet 116 through which hydrogen gas produced within the hydrogen generator 100 can be released. The hydrogen outlet 116 can include a valve or be connected to a hydrogen consuming apparatus that can control the release of hydrogen gas. Within the housing 110 are several heater assemblies, each including a heater 120 secured to a heater support 122 with a mount 124 that will allow the heater 120 to pivot slightly to insure a large interfacial surface area between the heater 120 and the surface of the fuel cartridge 200 when inserted into the hydrogen generator 100. The heater supports 122 are strips of a spring material that are fixedly attached at one end to the hydrogen generator 100. At the opposite end, each heater support 122 engages an edge of a cam bar 130 at approximately a 90 degree angle. The cam bars 130 are held against a side of the housing 110 by several guides 134 that allow the cam bar 130 to move laterally, toward and away from the door opening in the housing 110. The edge of cam bar 130 has two elevations connected by an angled edge 132 that provides a ramp between the two elevations. When the door 112 is open, as shown in FIGS. 1, 2, 3A and 3B, the cam bars 132 are disposed toward the door opening, and the ends of the top and bottom heater supports 122 are respectively deflected, against the spring force of the heater supports 122, toward the top and bottom of the housing 110. This provides a gap between the heaters 120 and the fuel cartridge 200 when the fuel cartridge 200 is disposed in the hydrogen generator 100, as can be seen most clearly in FIGS. 3A and 3B.

Figure 2:
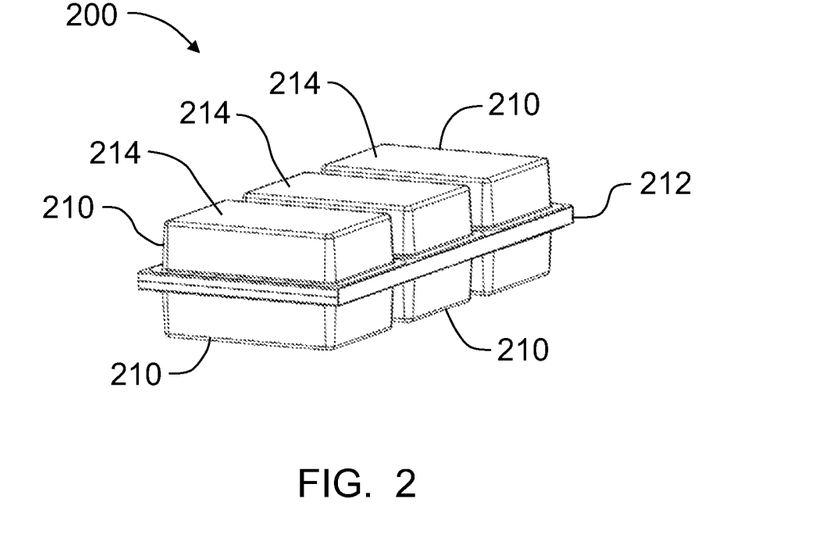
FIG. 2 is a perspective view of a fuel cartridge for use in the hydrogen generator in FIG. 1.

The fuel cartridge 200 is shown in FIG. 2. It includes a package with six fuel compartments 210, three on the top and three on the bottom as the fuel cartridge 200 is oriented in FIG. 2. These compartments 210 can be formed in the fuel cartridge package, which can include top and bottom halves, sealed around their edges 212. The surfaces 214 that face the heater assemblies (referred to above as heating surfaces of the fuel cartridge 200) have good thermal conductivity to provide good heat transfer from the heaters 120 to the fuel composition within the compartments 210.

Figure 3A:
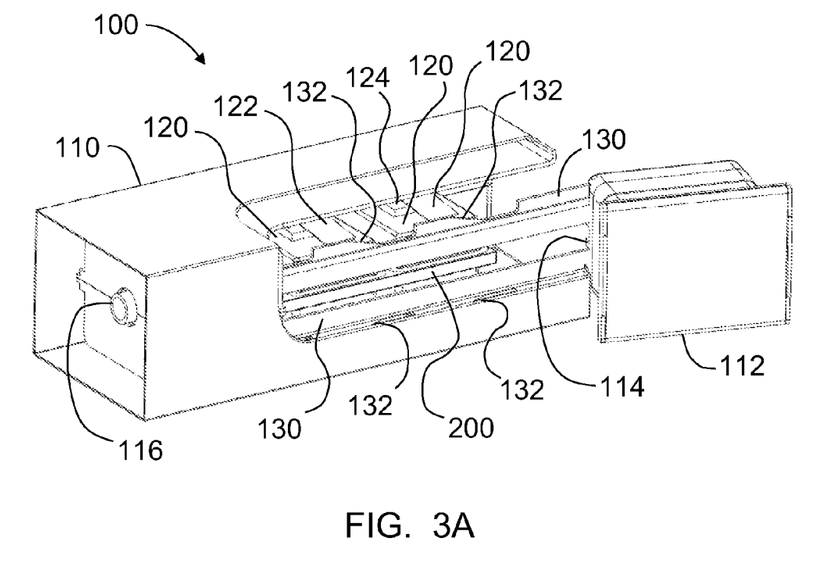
FIG. 3A is a partially cut-away side perspective view of the hydrogen generator in FIG. 1 in with the fuel cartridge in FIG. 2 disposed therein and the door open.
Figure 3B:
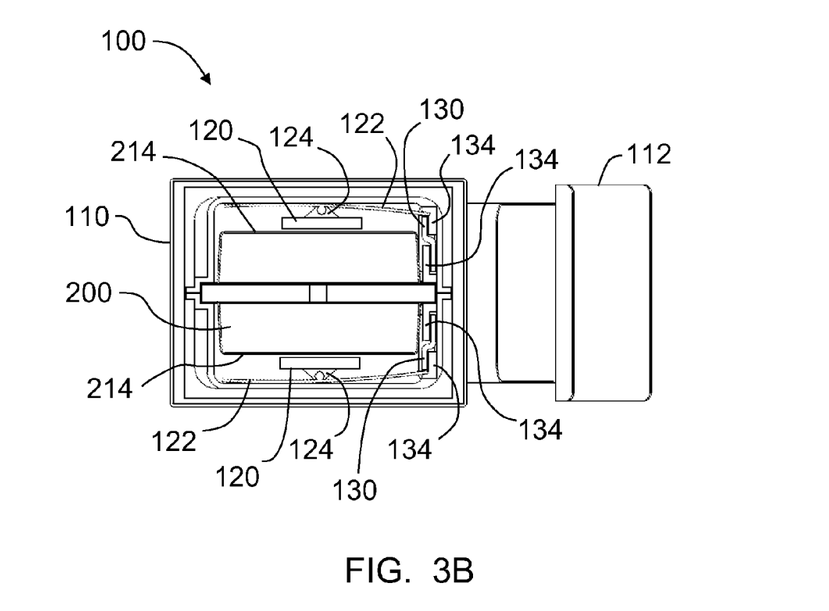
FIG. 3B is a cross-sectional drawing of the hydrogen generator and fuel unit in FIG. 3A, as viewed from the rear of the hydrogen generator.
Figure 4A:
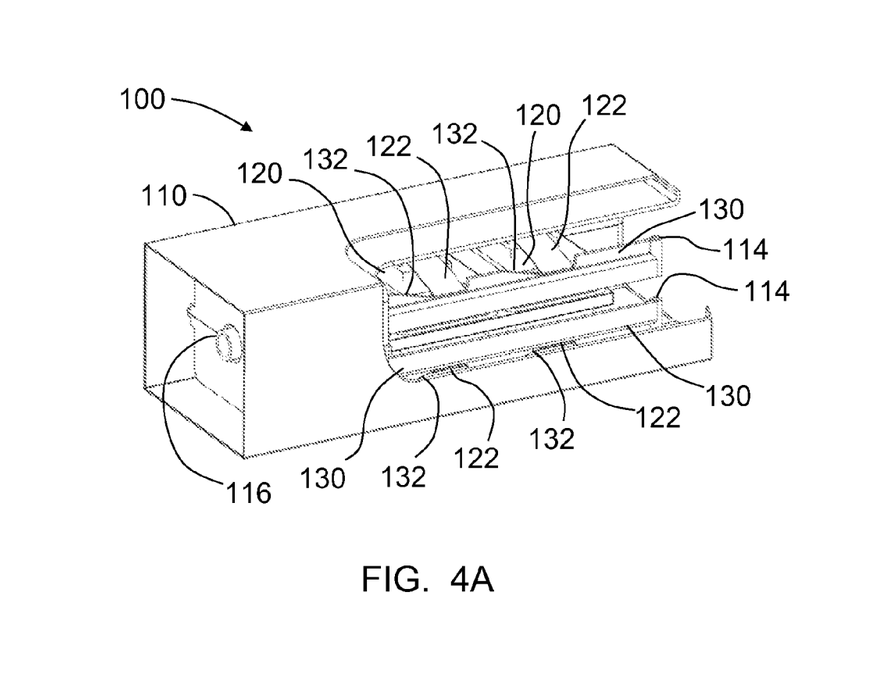
FIG. 4A is a partially cut-away side perspective view of the hydrogen generator in FIG. 1 in with the fuel cartridge in FIG. 2 disposed therein, in a door closed position (door not shown)
Figure 4B:
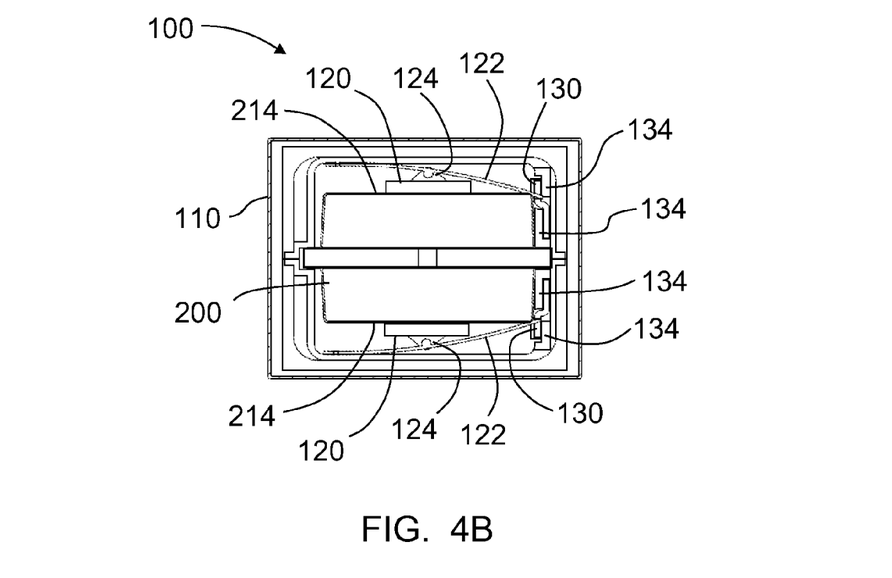
FIG. 4B is a cross-sectional drawing of the hydrogen generator and fuel unit in FIG. 4A, as viewed from the rear of the hydrogen generator.

FIGS. 3A and 3B are perspective and cross-sectional views, respectively, of the hydrogen generator 100 with a fuel cartridge 200 disposed therein and the door 112 open. The cam bars 130 are attached to the door 112 by hinges 114. With the door 112 open, the cam bars 130 are shifted toward the door opening (to the right in FIG. 3A), so that the heater supports 132 are deflected against their spring force, to retract the heater assemblies toward the top and bottom of the housing 110 and provide a gap between the heaters and the heating surfaces 214 of the fuel unit 200. In this embodiment, the door 112 must first be moved outward from the door opening before it can be swung open. Moving the door 112 outward simultaneously shifts the attached cam bars 130 outward. As this occurs, the ends of the heater supports 122 are forced along the angled edges 132 of the cam bars 130, from the elevations farthest from the top and bottom of the housing 110 (as shown in FIGS. 4A and 4B) to the elevations closest to the top and bottom of the housing 110 (FIGS. 3A and 3B), thereby moving the heater supports 122 in a direction normal to the outward lateral motion of the cam bars 130. The resultant gap between the heaters 120 and the heating surfaces 214 of the fuel unit 200 provide clearance for removal and insertion of fuel units 200.

To close the door 112 it is pivoted on the hinges 114 and then pushed inward, into the door opening in the housing 110. Moving the door 112 inward shifts the attached cam bars 130 laterally inward, away from the door opening. As the cam bars 130 move laterally inward, the ends of the heater supports 122 move along the angled edges 132 to the edge elevations farthest from the top and bottom of the housing 110, and the heater supports bias the heaters 120 against the heating surfaces 214 of the fuel cartridge 200. The hydrogen generator 100 is shown in the door closed position, with the heater assemblies extended, in FIGS. 4A and 4B. The door is not shown in FIG. 4A in order to better show the hinges 114 on the cam bars 130.

The embodiment of the hydrogen generator 100 shown in the drawings can be modified as disclosed herein. For example, rather than the cam bars 130 being attached to the door 112, biasing members at the oppose ends of the cam bars 130 could be used to shift the cam bars 130 outward when the door 112 is opened, and the closing door 112 could push the cam bars 130 inward against the biasing members to shift the cam bars laterally inward.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising: a housing having a door; a cavity within the housing;
 a fuel unit removably disposed within the cavity and containing a hydrogen-containing material that can release hydrogen gas when heated; and
 a heater assembly comprising a heater disposed in the cavity for heating the fuel unit; wherein:
 the fuel unit is removable when the door is in an open position, and the housing is sealed when the door is in a closed position;
 the heater assembly is in a retracted position in which a gap is present between the heater assembly and the fuel unit when the door is in the open position;
 the heater assembly is in an extended position in which the heater assembly is disposed against the fuel unit when the door is in the closed position;
 the hydrogen generator further includes a mechanism for moving the heater assembly between the retracted and extended positions, the motion of the heater assembly being actuated by a motion of the door between the open and closed positions;
 wherein the heater assembly includes a heater support to which the heater is secured, and the heater support is movable by the mechanism: and,
 wherein the mechanism includes a cam bar with an angled surface that deflects the heater support in a direction normal to a lateral motion of the cam bar.

2. The hydrogen generator according to claim 1, wherein the heater support biases the heater assembly away from the housing.

3. The hydrogen generator according to claim 1, wherein the heater support biases the heater assembly toward the housing.

4. The hydrogen generator according to claim 1, wherein the mechanism for moving the heater assembly can deflect the heater support to move the heater assembly.

5. The hydrogen generator according to claim 1, wherein the cam bar is attached to the door.

6. The hydrogen generator according to claim 1, wherein the cam bar is biased by a biasing member to move toward the door when the door is moved from the closed position and pushed against the biasing member when the door is moved to the closed position.

7. The hydrogen generator according to claim 1, wherein the hydrogen generator includes a plurality of heaters.

8. The hydrogen generator according to claim 7, wherein each heater is disposed on a single heater assembly.

9. The hydrogen generator according to claim 7, wherein more than one of the heaters is disposed on a single heater assembly.

10. The hydrogen generator according to claim 7, wherein each heater is disposed to heat one or more of a plurality of segregated quantities of the hydrogen-containing material.

11. The hydrogen generator according to claim 10, wherein each heater is disposed to heat only one of the plurality of segregated quantities of the hydrogen-containing material.

* * * * *